United States Patent [19]

Lambden

[11] 4,289,925
[45] Sep. 15, 1981

[54] ELECTROGRAPHIC APPARATUS

[75] Inventor: Martin R. Lambden, Bourne End, England

[73] Assignee: Quest Automation Limited, Dorset, England

[21] Appl. No.: 43,595

[22] Filed: May 29, 1979

[30] Foreign Application Priority Data

May 30, 1978 [GB] United Kingdom ............ 23699/78

[51] Int. Cl.³ ............................................. G08C 21/00
[52] U.S. Cl. .................................................... 178/18
[58] Field of Search ................ 178/18, 19, 20; 35/63, 35/61, 65; 340/146.3 SY; 273/395; 160/374, 374.1, 378

[56] References Cited

U.S. PATENT DOCUMENTS

| | | | |
|---|---|---|---|
| 3,522,664 | 8/1970 | Lambright et al. | 178/18 X |
| 3,735,023 | 5/1973 | Hurst et al. | 178/18 X |
| 3,959,585 | 5/1976 | Mattes et al. | 178/18 |
| 4,070,544 | 1/1978 | Lambden | 178/18 |
| 4,149,029 | 4/1979 | Pobgee | 178/18 |

*Primary Examiner*—Thomas W. Brown
*Attorney, Agent, or Firm*—Pollock, Vande Sande & Priddy

[57] ABSTRACT

Electrographic apparatus includes a transducer pad having a flexible membrane mounted over a base member with facing surfaces of the membrane and base member being electrically conductive and having electrical voltages applied thereto whereby to provide electrical signals representing the coordinates of a location at which pressure is applied to the flexible membrane locally by a pen or stylus, wherein in order to maintain an appropriate tension in the flexible membrane, the membrane is attached to and mounted on an outwardly tensioned rectangular frame member. The frame member may comprise separate frame elements and spring members forcing the elements away from one another. Alternatively, the frame member may be resilient and be inwardly compressed during the attaching thereto of the flexible membrane whereby the inherent resilience of the frame member subsequently tensions the flexible membrane.

10 Claims, 8 Drawing Figures

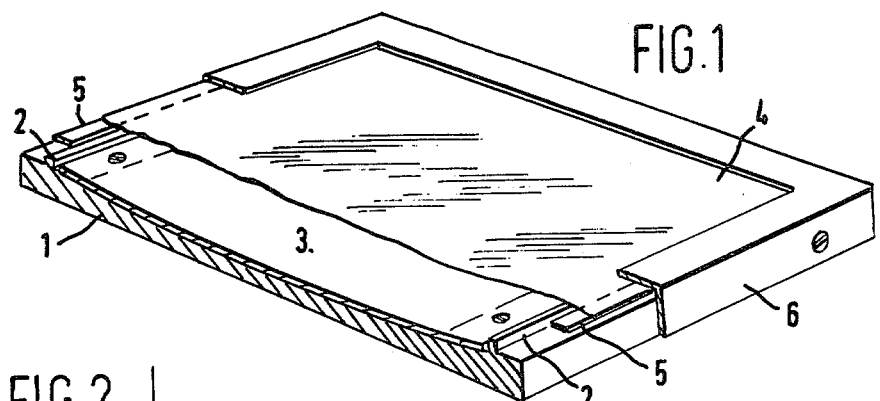
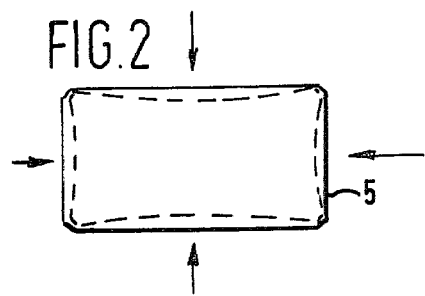
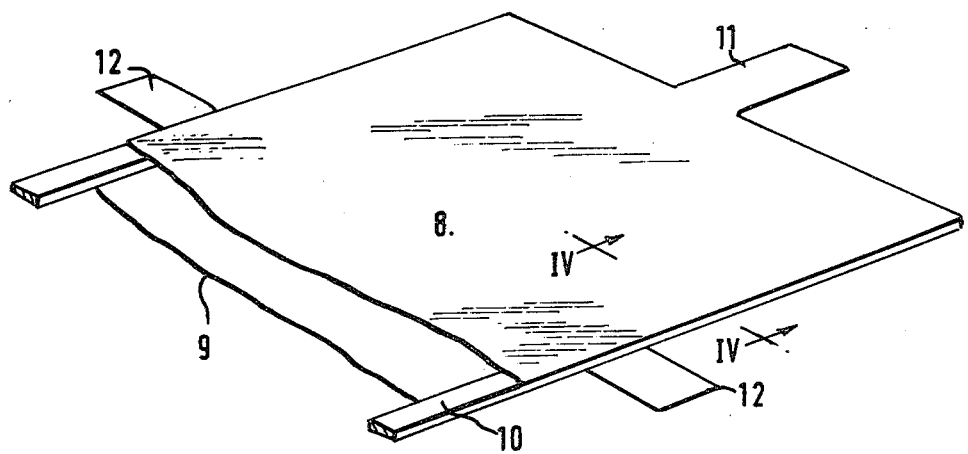
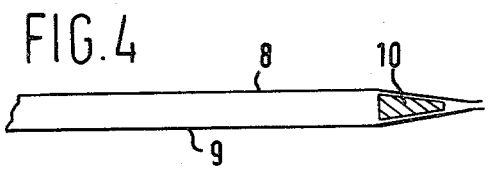

ELECTROGRAPHIC APPARATUS

FIELD OF THE INVENTION

This invention is concerned with transducer pads for electrographic apparatus arranged to provide electrical signals representing the co-ordinates of a location at which pressure is applied locally to a writing surface of the pad by the action, for example, of a stylus or writing implement.

Such apparatus can be arranged to provide substantially continuous electrical monitoring of the position of a writing implement during writing or drawing on a document resting on the writing surface of a transducer pad and the resulting electrical signals can be used for example to provide simultaneous reproduction of the writing or drawing at a distance.

DESCRIPTION OF THE PRIOR ART

A known type of transducer device comprises a flexible membrane mounted parallel to a fixed base, the opposing surfaces of the membrane and the base being each coated with a resistive film. Excitation voltages are applied to the resistive films at an angle to one another, usually 90 degrees, through conducting strips so that when pressure is applied to the membrane by a stylus or the like, two analog electrical voltages related unambiguously to the position of the stylus are obtained.

SUMMARY OF THE INVENTION

An object of this invention is to provide an improved construction of transducer pads of this type, particularly as regards the tensioning of the flexible membrane.

From one aspect, the invention provides a transducer pad for electrographic apparatus comprising a flexible membrane having a resistive surface with its edges secured to a rectangular frame, the opposite sides of which are pressed outwardly away from one another by resilient means.

From another aspect, the invention provides a transducer pad for electrographic apparatus in which the flexible resistive membrane is secured along its edges to the members of a rectangular frame and is tensioned by resilient means forcing opposite members of the frame outwardly away from one another.

The frame may be a complete frame of resilient material which is pre-stressed before the membrane is secured to it, so that it expands thereafter to provide the resilient means tensioning the membrane.

Alternatively, the frame may comprise four separate bars to which the membrane is secured and which are forced apart from one another by spring means to tension the membrane.

The membrane may be secured to the frame by adhesive which should be compatible as to its characteristics with the material of the membrane.

When a complete frame is used with the membrane, the side members of the frame may increase in width from each end to the center so that a substantially uniform stress is applied to the membrane. The width of the material at the corners of the frame may be reduced to increase the resilience of the frame.

Membranes forming the top and bottom surfaces respectively may be secured as by glueing to a frame, of which the sides are forced outwardly so that an easily replaceable unit for the transducer is provided. The side members of the frame may taper outwardly in cross-section so that the edges of the two membranes may be brought together and secured by adhesive.

BRIEF DESCRIPTION OF THE DRAWINGS

Other parts of the invention are embodied in the preferred forms which will now be described in some detail, with reference to the accompanying drawings, in which:

FIG. 1 is a perspective view partly in section of one form of transducer according to the invention;

FIG. 2 is a plan view of a frame used in the form of FIG. 1;

FIG. 3 is a perspective view of a unit embodying two resistive surfaces;

FIG. 4 is a section on the line IV—IV of FIG. 3 to an enlarged scale;

DESCRIPTION OF THE PREFERRED EMBODIMENT

Figure 5:
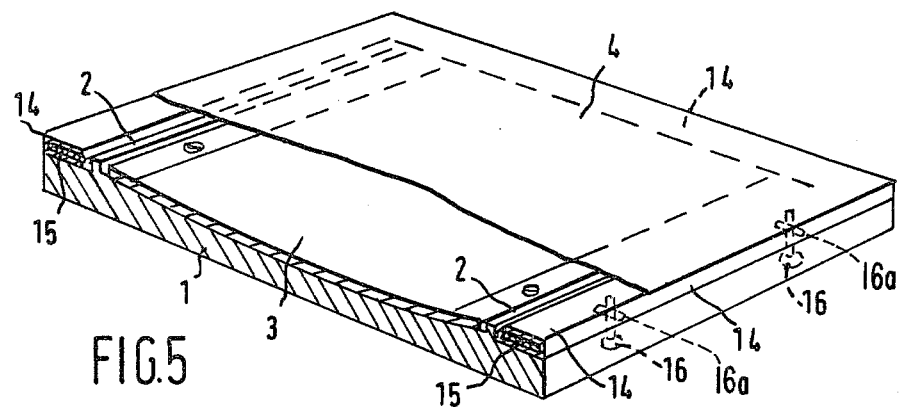
FIG. 5 is a perspective view of another form of transducer according to the invention.

As shown in FIG. 1, a transducer pad comprises a base 1 having an upstanding rectangular nib 2 parallel to its four edges. The top surface of the base 1 is slightly concave and carries a resistive surface 3 (the Y surface) which, as shown, comprises a membrane secured to the base by screws. A membrane 4 having a resistive under surface (the X surface) is stretched across the nib 2 so as to be spaced from the resistive surface 3. Means (not shown) are provided to supply excitation voltages to the X and Y surfaces at right angles to one another so that when the two surfaces are brought into contact at any point, two analog electrical voltages are produced related unambiguously to the location of that point.

The membrane 4 is secured by adhesive to a resilient frame 5. Before application of the membrane, the frame 5 is compressed inwardly from each side as indicated by the arrows in FIG. 2. The membrane 4 is then glued to the frame by means of a compatible adhesive and the frame and membrane held between two plates until the adhesive is set. The surfaces of these plates are coated with polytetrafluoroethylene to prevent sticking of the plates to the membrane. A suitable adhesive is a modified polyester resin sold by G. T. Sheldahl Limited, Eastern Road, Bracknell, England, under the designation "Schjel-bond adhesive".

When the adhesive has set, the plates are removed and the compressive stress on the frame is removed. The frame then expands and exerts tensile forces on the membrane to produce a uniformly taut surface.

The sides of the frame 5 are shaped to provide for uniform stress on the membrane 4. The width of the frame sides increases inwardly from each end to the center in a manner which can be determined by the conventional loadedbeam theory. To increase the resilience of the frame, the corners may be recessed to reduce the width of material there.

The frame 5 is placed on the base 1 outside the nibs 2 and is secured by a cover 6. The membrane 4 presses on the rectangular nib 2 which determines the clearance between the X and Y surfaces. A slight difference in height between the underside of the cover 6 and the tip of the nib 2 provides additional tension to the diaphragm and ensures its flatness.

In the form shown in FIG. 3, two membranes 8, 9 having resistive surfaces are glued to opposite sides of the rectangular spring frame 10 with their resistive surfaces opposite to one another. Silver connection strips 11, 12 are provided on opposite sides of membranes 8, 9 respectively. In manufacture, the spring frame 10 is stressed before the membranes are attached so that when released the frame expands and tautens the two membranes.

The cross-section of the frame 10 is such as to provide the desired separation of the X and Y surfaces while, at the same time, being of low torsional rigidity and strength for low, even tensioning of the surfaces. The cross-section of the frame is preferably trapezoidal as shown in FIG. 4, tapering towards the outside, so that the edges of the membranes 8, 9 can be brought close to one another for glueing together.

Figure 6:
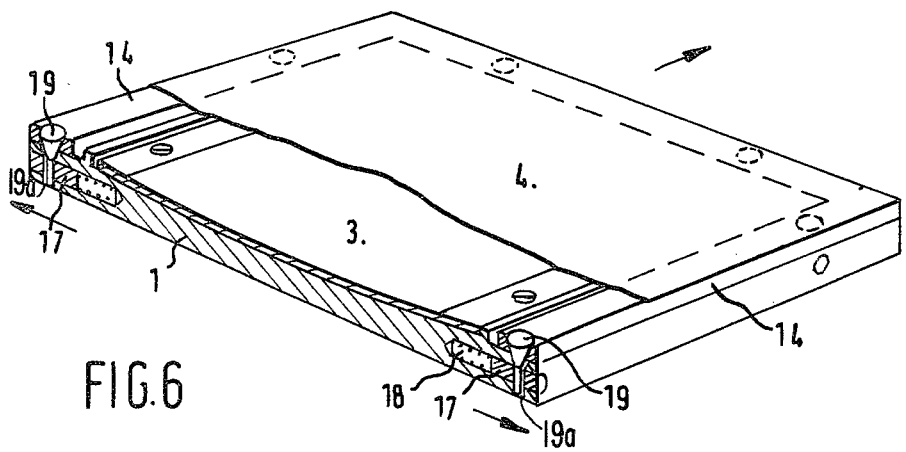
FIG. 6 is a perspective view of another form.
Figure 7:
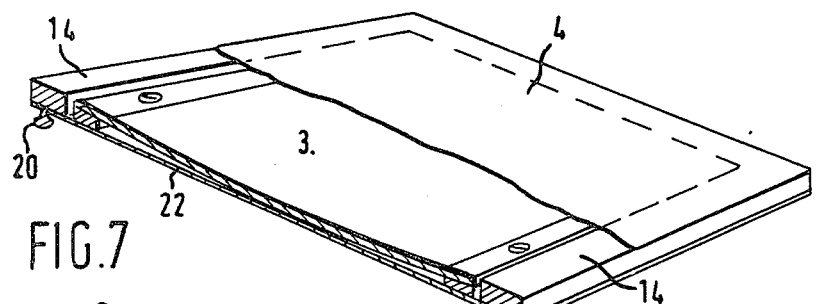
FIG. 7 is a perspective view of yet another form.

In the forms of the invention shown in FIGS. 5, 6 and 7, a frame comprising four separated bars is used and spring means are provided to expand the frame and stretch the membrane in two directions at right angles.

In FIG. 5, the membrane 4 is secured by adhesive along its edges to four separate bars 14 which together form a rectangular frame. Within the bars 14 are based springs 15. The membrane 4 is placed on the base 1 with the bars outside the nib 2 and the springs 15 bear against the sides of the nib exerting a force tending to force opposite bars apart and so tension the membrane 4. The bars 14 are retained in this extended position by screws 16 securing them to the base 1, the screws 16 being mounted in slots 19a so that opposite bars can be forced apart as described.

In the form shown in FIG. 6, the membrane 4 is secured as in FIG. 5 to four bars 14. In the base 1, on each of the four sides thereof, plungers 17 pressed outwardly by springs 18 are provided. These plungers are each formed with a transverse bore and a peg 19 having a tapered end passes through a tapered hole in the bar 14 into this bore. The pegs 19 are mounted in slots 19a, and springs 18 force the plungers 17 and the pegs 19 outwardly thereby forcing opposite bars 14 apart and tensioning the membrane 4.

Figure 8:
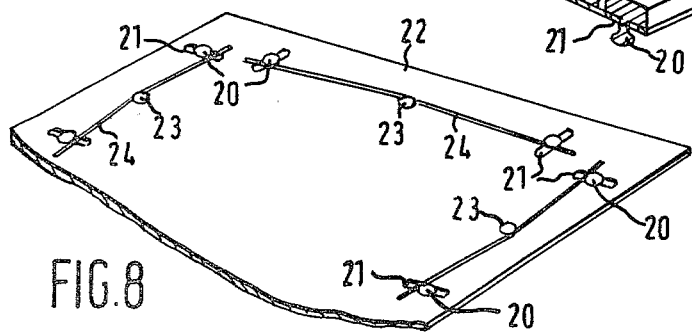
FIG. 8 is an underneath view of the form of FIG. 7.

In the form shown in FIG. 7, the bars 14 to which the membrane 4 is secured, are formed with downwardly projecting pegs 20 which pass through extended slots 21 in a sheet metal base 22 which supports the lower resistive surface 3. Upstanding projections 23 (see FIG. 8) are provided on the metal sheet 22 between the slots 21 and wire springs 24 engage opposite sides of these projections 23 and of the pegs 20, so as to force the pegs on opposite sides away from one another.

It will be understood that the invention is not restricted to the details of the preferred forms described by way of example, which may be modified without departure from the scope of the accompanying claims.

I claim:

1. In an electrographic apparatus of the type comprising a transducer pad for providing electrical signals representing the coordinates of a location at which pressure is applied locally to a writing surface of the pad by a pen or stylus, the transducer pad including a base member having a conductive surface to which a voltage is applied, the improvement comprising a flexible frame member adapted to be mounted on said base member, a flexible membrane securely mounted on said flexible frame member, said flexible membrane being spaced from said base member and having a conductive surface adapted to make electrical contact with the conductive surface of the base member when a pen or stylus is applied to said flexible membrane, and means for applying voltage to the said conductive surface of said flexible membrane, said flexible frame member comprising four sides each of which is prestressed inwardly during the securing of said flexible membrane thereto and each of which increases in cross section from its ends to its center so as to cause said four sides to produce uniform tensile force in said flexible membrane secured thereto.

2. Electrographic apparatus according to claim 1 wherein the sides of said frame member are recessed at their ends.

3. Electrographic apparatus according to claim 1 including rectangular upstanding nib means mounted on said base member around said conductive surface of said base member and bearing against said flexible membrane to urge it away from said conductive surface of said base member.

4. In an electrographic apparatus of the type comprising a transducer pad for providing electrical signals representing the coordinates of a location at which pressure is applied locally to a writing surface of the pad by a pen or stylus, the pad including a base member having a conductive surface to which a voltage is applied, the improvement comprising a frame member adapted to be mounted on said base member, a flexible membrane securely mounted on said frame member, said flexible membrane being spaced from said base member and having a conductive surface adapted to make electrical contact with the conductive surface of the base member when a pen or stylus is applied to said flexible membrane, and means for applying voltage to said conductive surface of said flexible membrane, said frame member comprising four sides and including spring biasing means arranged to urge opposite ones of said sides apart from one another thereby to tauten said flexible membrane.

5. Electrographic apparatus according to claim 4 wherein said base member includes rectangular upstanding nib means disposed around said conductive surface of said base member and adapted to bear against said flexible membrane to urge it away from said conductive surface of said base member.

6. Electrographic apparatus according to claim 5 in which said spring biasing means is arranged to act against side surfaces of said nib means.

7. Electrographic apparatus according to claim 4 wherein said frame member includes four plungers, one for each side of said frame member, mounted in said base member and mechanically coupled to respective sides of said frame member by pegs, said plungers being acted upon by said spring biasing means.

8. Electrographic apparatus according to claim 4 wherein said frame member includes a plurality of pegs which are attached respectively toward an end of each of said sides, said pegs extending through the base member, and projections on the base member positioned centrally with respect to each side of said frame member, said spring biasing means comprising four wire springs each fixed between a respective one of said projections and a pair of said pegs.

9. In an electrographic apparatus of the type comprising a transducer pad for providing electrical signals representing the coordinates of a location at which pressure is applied locally to a writing surface of the pad by a pen or stylus, the pad including a base member, the improvement comprising a flexible frame member adapted to be mounted on said base member, a first flexible membrane secured to said flexible frame member, a second flexible membrane secured to said flexible frame member in spaced relation to said first flexible membrane said first flexible membrane having a conductive surface adapted to make electrical contact with a conductive surface of said second flexible member when a pen or stylus is applied to said first flexible membrane, and means for applying voltages to the said conductive surfaces of said flexible membranes, said flexible frame member comprising four sides each of which is prestressed inwardly during the securing of said flexible membranes thereto to cause said four sides to produce uniform tensile force on said first and second flexible membranes secured thereto.

10. Electrographic apparatus according to claim 9 in which each of said sides of said frame member is trapezoidal in cross section, said sides being so oriented that the narrower edges of said sides form the outer edges of said frame member.

* * * * *